(12) United States Patent
Toyama et al.

(10) Patent No.: US 9,256,845 B2
(45) Date of Patent: Feb. 9, 2016

(54) ICAFÉ PRE-ORDERING

(75) Inventors: Kentaro Toyama, Bangalore (IN); Garrett Vargas, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 817 days.

(21) Appl. No.: 12/359,228

(22) Filed: Jan. 23, 2009

(65) Prior Publication Data

US 2010/0191549 A1 Jul. 29, 2010

(51) Int. Cl.
G06F 1/20 (2006.01)
G06F 13/14 (2006.01)
G06Q 10/02 (2012.01)
G06Q 30/06 (2012.01)

(52) U.S. Cl.
CPC ............ G06Q 10/02 (2013.01); G06Q 30/0601 (2013.01)

(58) Field of Classification Search
CPC ........ G06F 1/20; G06F 13/14; G06F 11/3604
USPC .............................................. 705/5, 1.1, 7.11
See application file for complete search history.

(56) References Cited

U.S. PATENT DOCUMENTS

| | | | |
|---|---|---|---|
| 6,324,517 B1 * | 11/2001 | Bingham et al. ................... 705/8 |
| 6,330,600 B1 * | 12/2001 | Matchefts et al. ............ 709/223 |
| 6,571,279 B1 | 5/2003 | Herz et al. |
| 6,944,679 B2 | 9/2005 | Parupudi et al. |
| 6,983,312 B1 * | 1/2006 | O'Neil .......................... 709/217 |
| 7,072,665 B1 * | 7/2006 | Blumberg et al. ......... 455/456.1 |
| 7,321,785 B2 | 1/2008 | Harris |
| 7,353,034 B2 | 4/2008 | Haney |
| 7,792,952 B2 * | 9/2010 | Howard et al. ............... 709/224 |
| 2003/0140088 A1 | 7/2003 | Robinson et al. |
| 2006/0015375 A1 * | 1/2006 | Lee et al. ........................... 705/5 |
| 2007/0294096 A1 | 12/2007 | Randall et al. |
| 2008/0005695 A1 | 1/2008 | Ozzie et al. |
| 2008/0109289 A1 * | 5/2008 | Vivadelli et al. ................... 705/7 |
| 2008/0132252 A1 | 6/2008 | Altman et al. |
| 2008/0267107 A1 * | 10/2008 | Rosenberg ..................... 370/312 |
| 2010/0070314 A1 * | 3/2010 | Jethani et al. ..................... 705/6 |

OTHER PUBLICATIONS

Hong, Jason et al., "Privacy and Security in the Location-Enhanced World Wide Web," In Proceedings of the Workshop on Privacy at Ubicomp 2003, Oct. 2003, 5 pages, http://www.cs.berkeley.edu/~tygar/papers/Privacy_security_location-enhanced_web.pdf [last accessed Apr. 14, 2009].

"Hoarding Content in M-Learning Context," International Graduate School in Information and Communication Technologies, Thesis Proposal, University of Trento, Italy, 2003, 14 pages, http://www.trifonova.net/docs/Thesis%20Proposal.pdf [last accessed Apr. 19, 2009].

(Continued)

*Primary Examiner* — Akiba Allen
(74) *Attorney, Agent, or Firm* — Steve Wight; Sandy Swain; Micky Minhas

(57) ABSTRACT

Technology for pre-ordering (e.g., pre-fetching content) at a shared computing premise is described. The technology can enable a user to locate and reserve an available seat at a shared computing premise (e.g., an iCafé). A service can transmit to the user a list of nearby iCafés or available seats that is ranked or ordered based on various criteria. The selected iCafé may pre-fetch content. The iCafé may also provide the pre-fetched content on removable media so that the user does not need to view all the pre-fetched content only at the iCafé. The iCafé may provide a search and/or document notification service and perform searches, download documents, and check for changes to specified documents even when the user is not logged on or using a computer at the iCafé. After the documents are retrieved and stored, the iCafé may send a notification to the user.

19 Claims, 17 Drawing Sheets

(56) References Cited

OTHER PUBLICATIONS

"Supporting Real-Time Location for Business Applications," Copyright 2004 Microsoft Corporation, 2 pages, http://download.microsoft.com/download/a/7/c/a7ccdaa7-09a2-4c0c-8824-a9509c87a011/MapPoint%20Location%20Server%20FactSheet%20FINAL.pdf [last accessed Apr. 14, 2009].

Satoh, Ichiro, "Software Agents for Ambient Intelligence," 2004 IEEE, pp. 1147-1152, http://research.nii.ac.jp/~ichiro/papers/satoh-smc2004.pdf [last accessed Apr. 14, 2009].

* cited by examiner

| 622 | 624 | 626 | 620 |
|---|---|---|---|
| iCafé ID | location | minimum waiting time or number of free computers/queues | |
| | | | |

| 632 | 634 | 630 |
|---|---|---|
| iCafé ID | pre-fetched content | |
| | | |

ICAFÉ PRE-ORDERING

BACKGROUND

In many countries, computers are very expensive for people to purchase. However, even in those countries, the use of computers has become very important to stay connected with the rest of the world so that users of the computers can view or exchange information. For example, viewers may desire to exchange electronic mail, download content (e.g., video, movies, music, lectures, etc.), view web sites, subscribe to web logs ("blogs"), conduct online banking, and complete other online activities.

In those and other countries, users sometimes have access to a computer at home or in their office, but may not have access to sufficient network bandwidth to complete the online activities they desire. For example, they may live in an area where it is impractical or unaffordable to subscribe to digital subscriber line ("DSL"), satellite, cable, or other high bandwidth Internet services. In some areas, even dialup connections may be too expensive because of telephone long distance or other network charges.

Internet Cafés ("iCafé's") are popular venues that users can use to resolve many of these issues. iCafés are a type of shared computing premises that subscribe to high bandwidth network access and share that bandwidth among many computers or Internet connections located at the iCafé's. Users can use computers provided by the iCafés for a fee or may be able to bring their own computer (e.g., laptop or other mobile device) into an iCafé and connect via a wired or wireless connection to the iCafé's network for shared high bandwidth Internet access. Users arrive at iCafés and wait for such a seat open. The seat can provide a computer or just a network connection to which a user can connect a personal computer, such as a laptop or other mobile computer. The users select and download content that they are interested in by employing the shared bandwidth provided at the iCafés.

SUMMARY

Technology for pre-ordering (e.g., pre-fetching content) at a shared computing premise is described. The technology can enable a user to locate an available seat at a shared computing premise (e.g., an iCafé) and request the seat to be reserved. The user can request a list of available seats from a location that is remote from the iCafé, such as by using a mobile computing device (e.g., a cellular telephone). As an example, the user can make the request by sending a message via a mobile device communications protocol, such as short message service ("SMS"). In such a case, the user can send a request for a list to a specified telephone number. A service that receives the request can then transmit to the user's mobile device a list of nearby iCafés or available seats that is ranked or ordered based on various criteria, such as proximity, cost, quality, availability of content, or other factors. The user can then select one of the seats or iCafés for reservation, such as by sending an SMS message. The iCafé may then pre-fetch content that may be of interest to the user. The iCafé may encrypt the pre-fetched content so that only the user can view it. The iCafé may not encrypt other content that is suitable for use by other potential users. The iCafé may also provide the pre-fetched (e.g., downloaded) content on removable media, such as rewritable memory devices, optical disks, and so forth, so that the user does not need to view all the pre-fetched content only at the iCafé.

The iCafé may provide a search and/or document notification service. A user can provide search criteria and/or indicate documents of interest. Thereafter, even when the user is not logged on or using a computer at the iCafé, the search and/or document notification service can perform the search, download documents, and check for changes to specified documents. The service may cull the results of the search based on the user's preferences or history. After the documents are retrieved and stored, the iCafé may send a notification to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
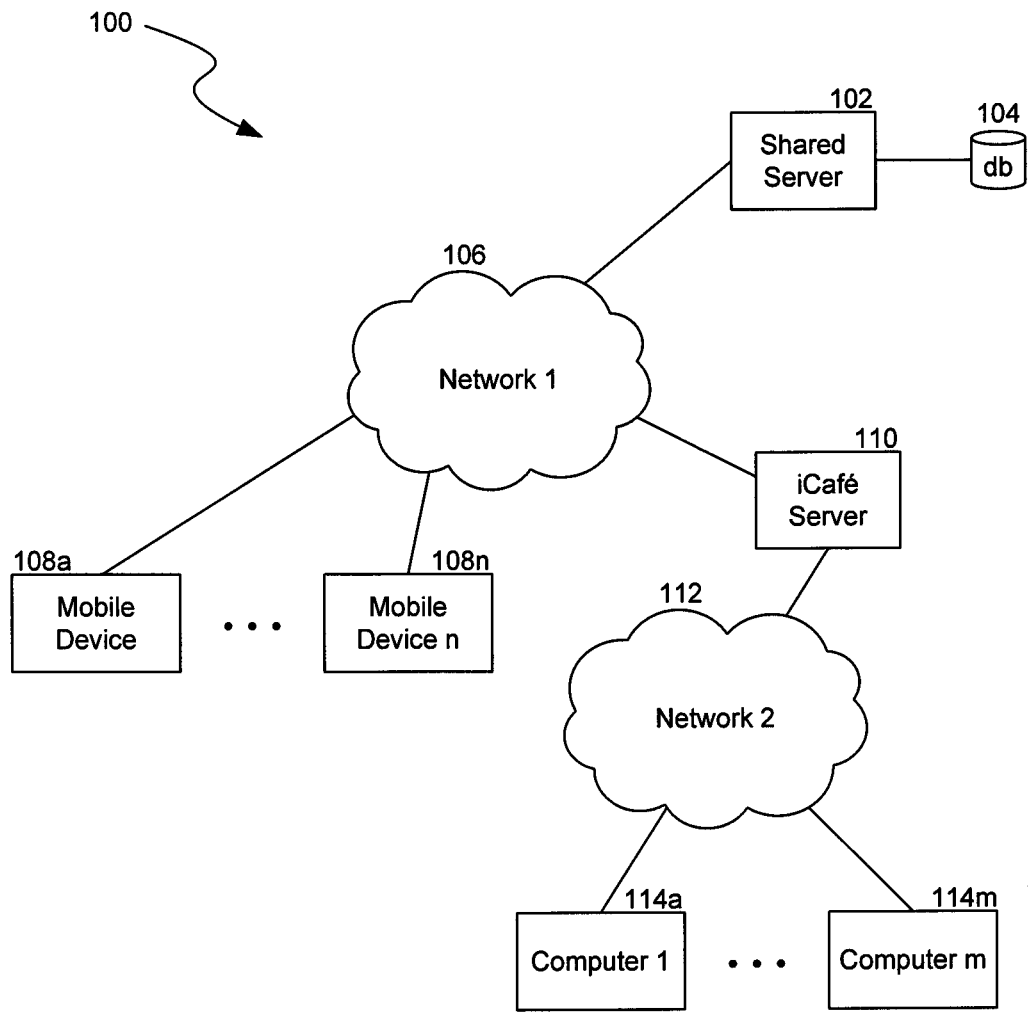
FIG. 1 is a block diagram illustrating components employed by the technology in various embodiments.

Technology for pre-ordering (e.g., pre-fetching content) at a shared computing premise is described. In various embodiments, the technology enables a user to locate an available seat at a shared computing premise (e.g., an iCafé) and request the seat to be reserved. The user can request a list of available seats remotely, such as from a mobile computing device (e.g., a cellular telephone). As an example, the user can make the request by sending a message via a mobile device communications protocol, such as short message service ("SMS"). In such a case, the user can send a request for a list to a specified telephone number. A service that receives the request can then transmit to the user's mobile device a list of nearby iCafés or available seats that is ranked or ordered based on various criteria, such as proximity, cost, quality, availability of content, or other factors. The user can then select one of the seats or iCafés for reservation, such as by sending an SMS message. The service can then notify the selected iCafé. The iCafé may then pre-fetch content that may be of interest to the user. The iCafé may encrypt the pre-fetched content so that only the user can view it. For example, the iCafé may encrypt pre-fetched email content. The iCafé may not encrypt other content that is suitable for use by other potential users, such as photos, videos, music, blogs, web sites, and so forth. The iCafé may also provide the downloaded content on removable media, such as rewritable memory devices, optical disks, and so forth, so that the user does not need to view all the pre-fetched content only at the iCafé.

In some embodiments, the iCafé may provide a search and/or document notification service. A user can provide search criteria and/or indicate documents of interest (e.g., by specifying uniform resource locators ("URLs")) to the iCafé. Thereafter, even when the user is not logged on or using a computer at the iCafé, the search and/or document notification service can perform the search, download documents, and check for changes to specified documents. The service may cull the results of the search based on the user's preferences or history. As an example, when the user provides "jaguar" as a search criteria, the service may remove entries not associated with animals (e.g,. cars) based on the fact that the user has previously searched for other animals. A human operator associated with the iCafé may also assist in culling the documents retrieved in response to the search. After the documents are retrieved and stored, the iCafé may send a notification to the user, such as via email or SMS, that the documents are ready for viewing and/or pickup.

In some embodiments, an iCafé may advertise its services. As an example, the iCafé may have downloaded a latest hit movie that may be of interest to some users. The iCafé may send an advertisement (e.g., via email or SMS) that the hit movie is available for instant viewing without waiting for downloading. An iCafé may be provided a list of popular content, such as movies, music, photographs, web sites, blogs, and so forth and pre-fetch and store that content even before that content is requested by users.

Several embodiments of the technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the importance system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 is a block diagram illustrating components employed by the technology in various embodiments. The distributed system of the technology 100 includes one or more shared servers 102 that may be connected to one or more databases 104. The shared server can be a server that provides services to one or more shared computing premises, such as iCafés. Each iCafé may have an iCafé server 110 that is connected to the shared server 102 via a network 106, such as the Internet. Users may exchange information with the shared server or other computing devices via mobile computing devices 108a through 108n. The mobile computing devices may be connected to the network 106 either directly (e.g., using a TCP/IP protocol) or a mobile device communications protocol (e.g., SMS). The iCafé server 110 may be connected via another network 112 to computers 114a through 114m. These computers can be shared use computers located within the iCafé.

Figure 2A:
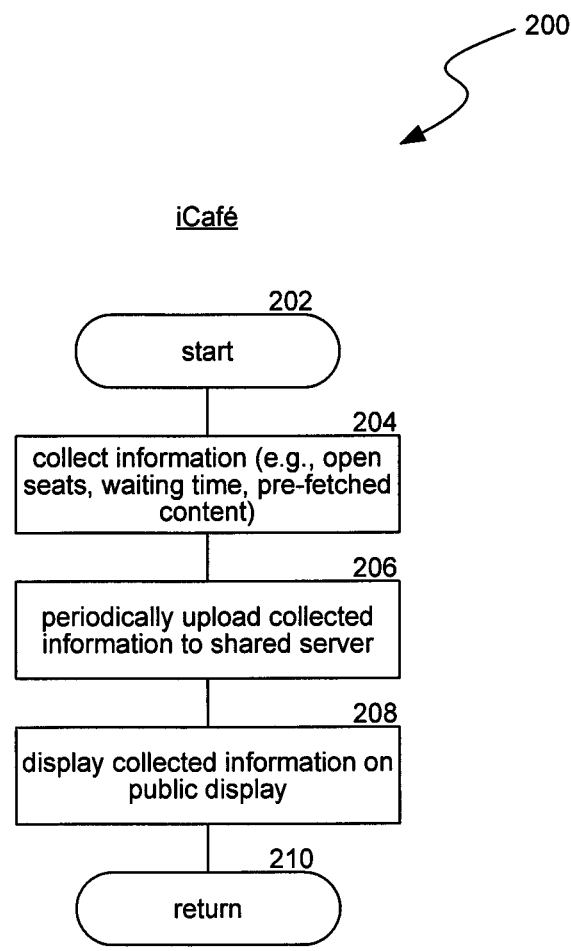
FIG. 2A is a flow diagram illustrating a routine invoked by the technology in some embodiments to collect, upload, and display information pertaining to an iCafé and its seats.

FIG. 2A is a flow diagram illustrating a routine invoked by the technology in some embodiments to collect, upload, and display information pertaining to an iCafé and its seats. The routine 200 may be performed by a server at an iCafé. The routine 200 begins at block 202. At block 204, the routine collects information, such as open seats, waiting time, what pre-fetched content is available, and so forth. At block 206, the routine periodically uploads the collected information to a shared server. At block 208, the routine may display various collected information on a public display, such as a neon sign outside the iCafé. At block 210, the routine returns.

Those skilled in the art will appreciate that the logic illustrated in FIG. 2A and described above, and in each of the flow diagrams discussed below, may be altered in a variety of ways. For example, the order of the logic may be rearranged, substeps may be performed in parallel, illustrated logic may be omitted, other logic may be included, etc.

Figure 2B:
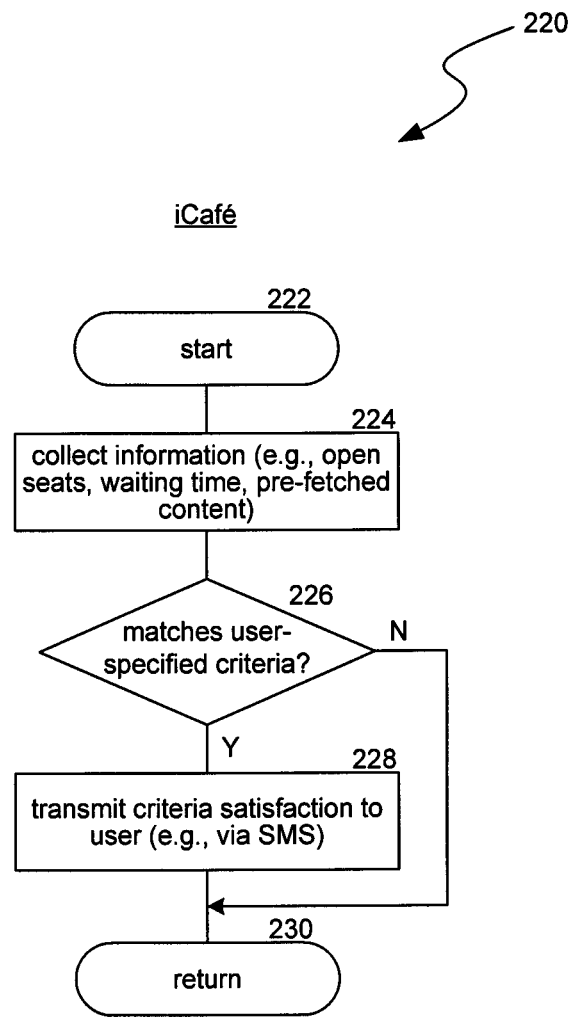
FIG. 2B is a flow diagram illustrating a routine invoked by the technology in some embodiments to collect and transmit seat information to a user.

FIG. 2B is a flow diagram illustrating a routine invoked by the technology in some embodiments to collect and transmit seat information to a user. The routine 220 may be performed by a server at an iCafé when a user has previously indicated criteria to the iCafé, such as a desire for pre-fetched content. The routine begins at block 222. At block 224, the routine collects information, such as a number of open seats, waiting time, availability of pre-fetched content, and so forth. At decision block 226, the routine determines whether one or more user criteria are matched. If one or more user criteria are matched, the routine continues at block 228. Otherwise, the routine returns at block 230. At block 228, the routine transmits an indication of the satisfied criteria to the user, such as via SMS, and then returns at block 230. When a computer sends an SMS message, the computer may employ a cellular telephone/modem, gateway, or some other service to send SMS messages.

Figure 2C:
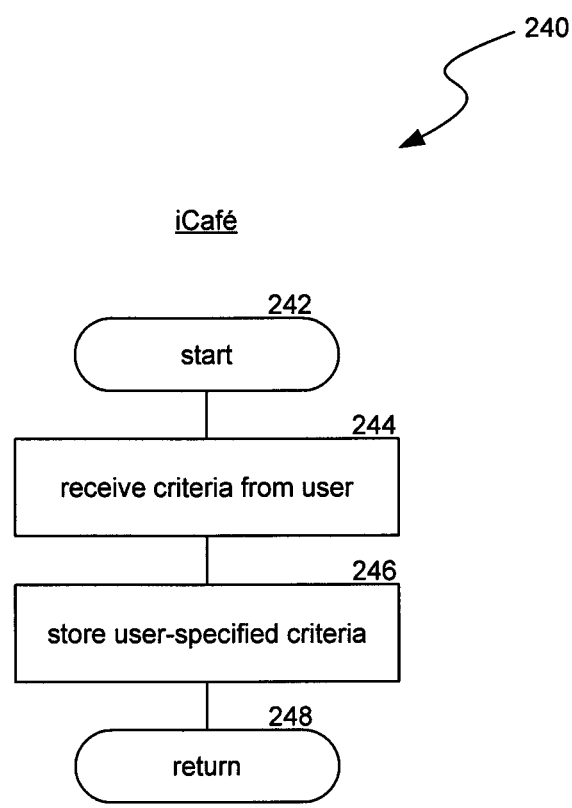
FIG. 2C is a flow diagram illustrating a routine invoked by the technology in some embodiments to collect and store user-specified criteria.

FIG. 2C is a flow diagram illustrating a routine invoked by the technology in some embodiments to collect and store user-specified criteria. The routine 240 may be performed by a server at an iCafé to receive and store criteria from a user. The routine 240 begins at block 242. At block 242, the routine receives criteria from a user. Examples of criteria include, e.g., availability of pre-fetched content, quality of service (e.g., bandwidth availability), and so forth. At block 246, the routine stores the user-specified criteria, such as in a database. At block 248, the routine returns.

Figure 3:
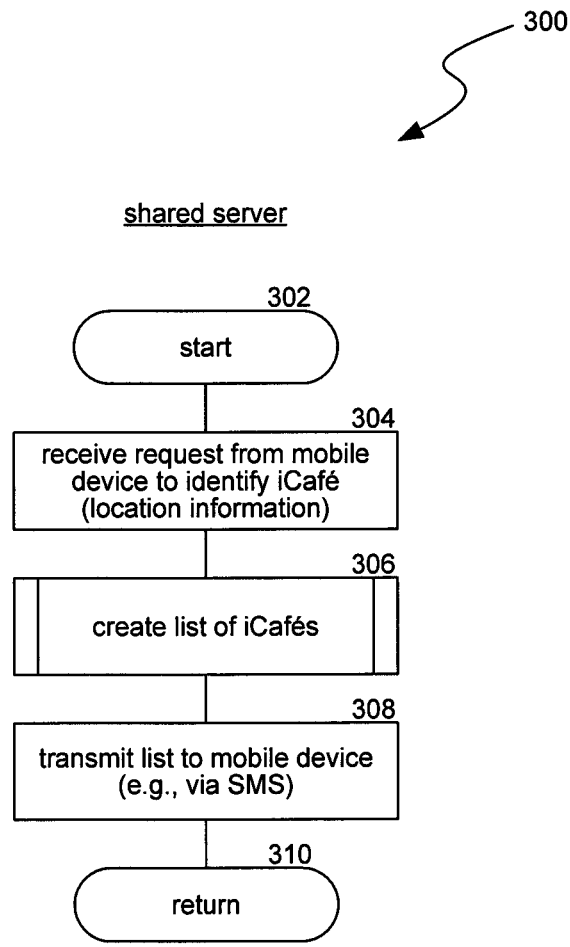
FIG. 3 is a flow diagram illustrating a routine invoked by the technology in some embodiments to receive a request from a user to identify an iCafé and provide a list of iCafés.

FIG. 3 is a flow diagram illustrating a routine invoked by the technology in some embodiments to receive a request from a user to identify an iCafé and provide a list of iCafés.

The routine 300 begins at block 302. At block 304, the routine receives a request from a user using a mobile device (e.g., a cellular telephone) to identify an iCafé. The request may be communicated in SMS or other data communications protocol, and may provide location information relating to the geographical position of the user. As an example, the request may provide global positioning unit (GPS) coordinates collected from the mobile device. At block 306, the routine creates a list of iCafés. The routine may invoke the subroutines described below in relation to FIG. 4A or 4B to create the list. At block 308, the routine transmits the created list (or a subset thereof to the mobile device, such as via SMS. At block 310, the routine returns.

Figure 4A:
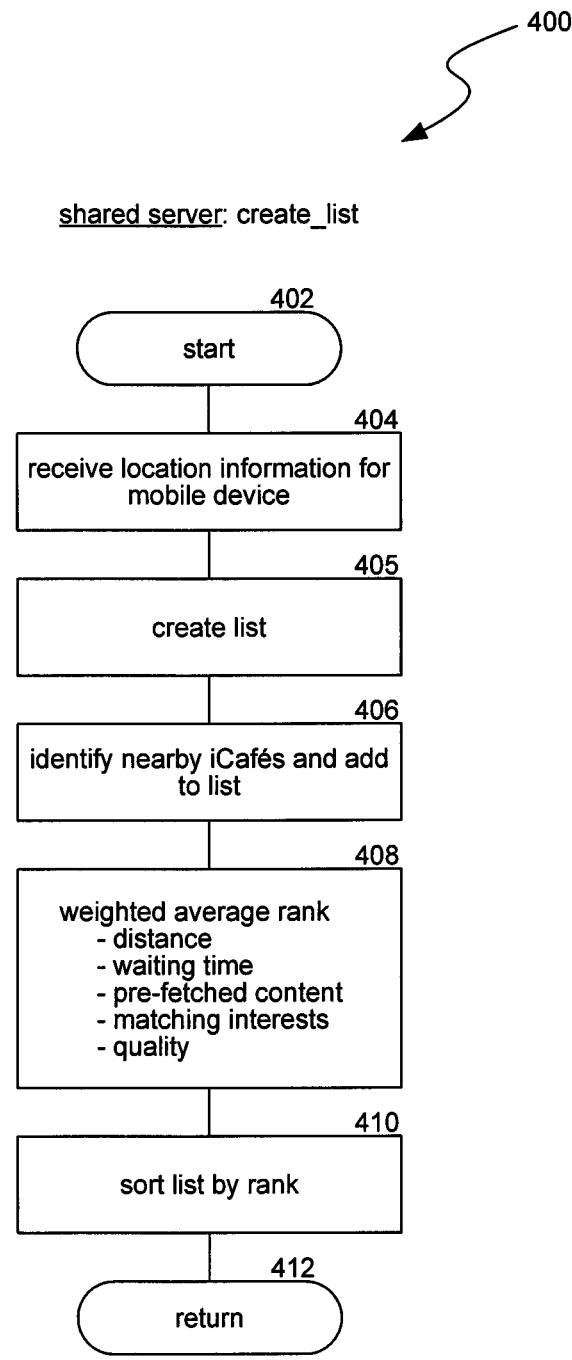
FIG. 4A is a flow diagram illustrating a routine invoked by the technology in some embodiments to create a list of iCafés.

FIG. 4A is a flow diagram illustrating a routine invoked by the technology in some embodiments to create a list of iCafés. The routine 400 may be invoked by a shared server and begins at block 402. At block 404, the routine receives location information from a mobile device. As an example, the routine may receive geographical location information from the mobile device (e.g., GPS coordinates). At block 405, the routine creates a list, which may initially be empty. At block 406, the routine identifies nearby iCafés and adds the nearby iCafés to the created list. The routine may be able to determine the proximity of nearby iCafés distances between the geographical location information provided by the mobile device and stored iCafés. Various techniques exist for computing distances between a known location and a list of locations. At block 408, the routine may compute a weighted average rank. The rank for each iCafé may be based on its distance from the mobile device, an indicated waiting time at the iCafé, what pre-fetched content that iCafé has, whether the pre-fetched content matches interests of the user, or various other quality measures. Examples of quality measures include, e.g., what processors the shared computers at the iCafés employ, what operating systems the computers employ, maximum bandwidth available at the iCafé, and other quality measures—subjective or objective. At block 410, the routine may sort the list by the ranks. At block 412, the routine returns. The routine may cull the list before providing it. As an example, the routine may only identify the top five ranking iCafés.

Figure 4B:
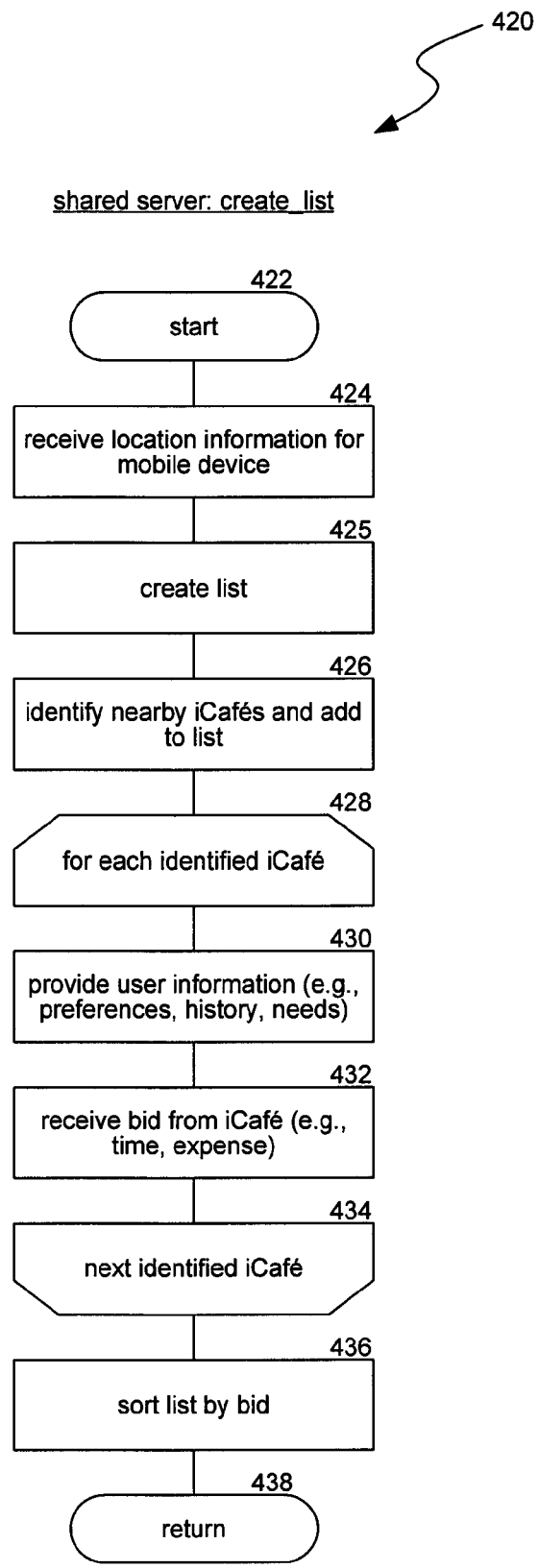
FIG. 4B is a flow diagram illustrating a routine invoked by the technology in some embodiments to create a list of iCafés.

FIG. 4B is a flow diagram illustrating a routine invoked by the technology in some embodiments to create a list of iCafés. A shared server can employ the routine illustrated in FIG. 4B instead of or in addition to the routine illustrated in FIG. 4A. The routine 420 begins at block 422. At block 424, the routine receives location information for the mobile device. At block 425, the routine creates a list, which may initially be empty. At block 426, the routine identifies nearby iCafés and adds them to the created list. In the loop of blocks 428 to 434, the routine receives bids from iCafés based on user information. At block 428, the routine selects an identified iCafé. At block 430, the routine provides user information, such as the user's preferences, history, needs, and so forth to the identified iCafé. At block 432, the routine receives a bid from the iCafé. The received bid may indicate waiting time, expense, and so forth. The waiting time may be an indication of how long the user may need to wait before having access to receive a seat at the identified iCafé. The expense may be an indication of how much the user would need to pay per time period, pre-fetched content, and so forth. At block 434, the routine selects another iCafé. At block 436, the routine sorts the list by bid. The routine may also cull the list, such as to identify only the best five bidders. At block 438, the routine returns.

Figure 5A:
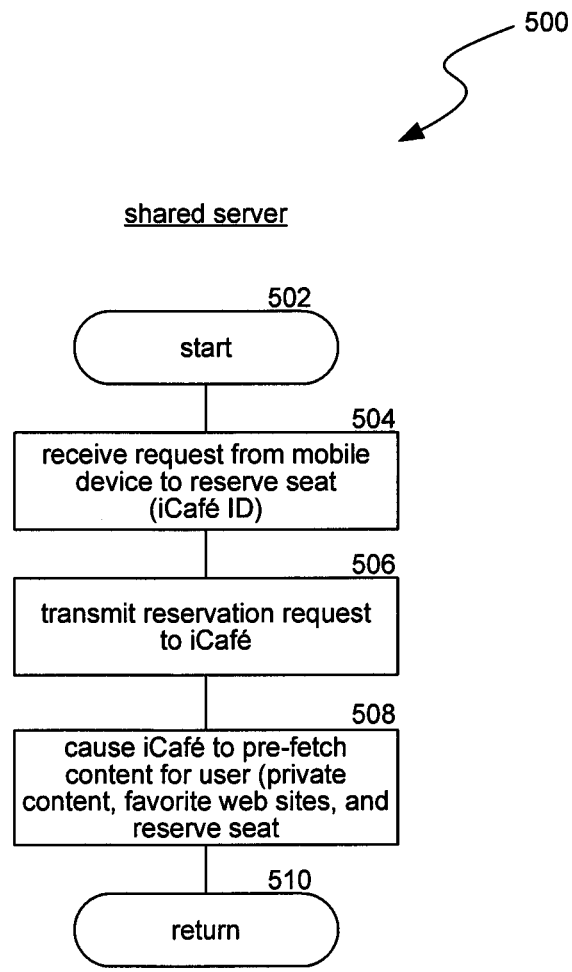
FIG. 5A is a flow diagram illustrating a routine invoked by the technology in some embodiments to reserve a seat at an iCafé.

FIG. 5A is a flow diagram illustrating a routine invoked by the technology in some embodiments to reserve a seat at an iCafé. A shared server may invoke the routine 500 when it receives a request from a user to reserve a seat. The routine 500 begins at block 502. At block 504, the routine receives a request from a mobile device to reserve a seat. The request may identify the iCafé that was previously identified in a list of iCafés with available seats. At block 506, the routine transmits the reservation request to the identified iCafé. At block 508, routine causes the identified iCafé to pre-fetch content for the user. The pre-fetched content can be private content for the user (e.g., email, and favorite web sites) or public content the user has expressed an interest in or when interest can be inferred based on prior history (e.g., music, videos, or other content). At block 510, the routine returns.

Figure 5B:
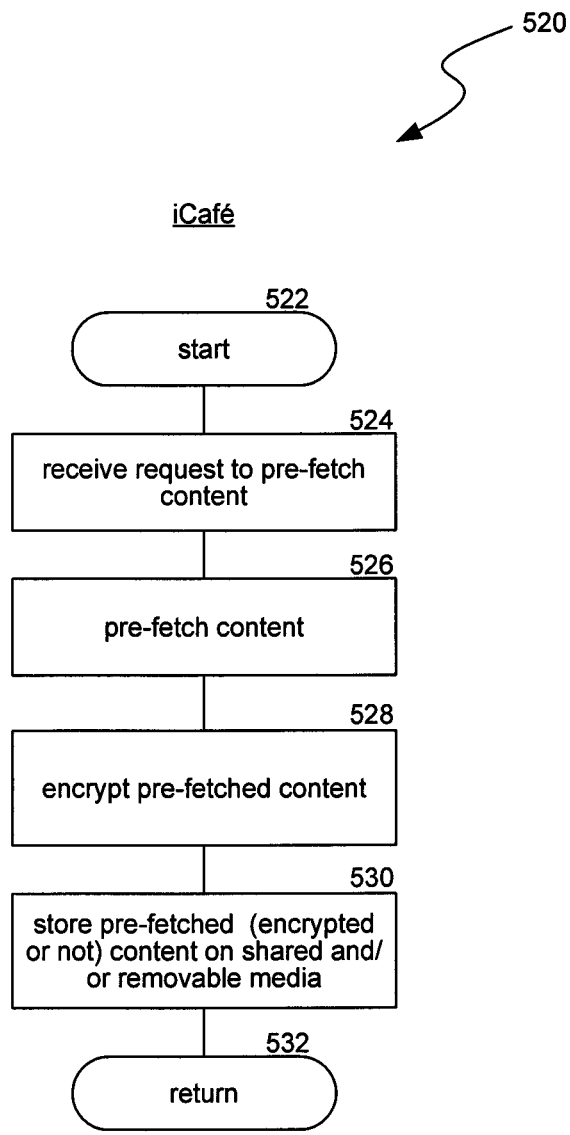
FIG. 5B is a flow diagram illustrating a routine invoked by the technology in some embodiments to pre-fetch content.

FIG. 5B is a flow diagram illustrating a routine invoked by the technology in some embodiments to pre-fetch content. The routine 520 may be invoked by an iCafé server to pre-fetch content for a user. The routine 520 begins at block 522. At block 524, the routine receives a request to pre-fetch content. The request may indicate a list of content, such as a list of uniform resource locators ("URLs"). At block 526, the routine pre-fetches the content. In some embodiments, the routine may require the user's credentials or may retrieve previously encrypted content that can only be unencrypted by the user (e.g., by providing a digital certificate, electronic signature, or other unencryption means). At block 528, the routine may encrypt the pre-fetched content. As an example, if the routine employed the user's credentials to download private content, it may encrypt the content so that only the user can view the content and not another user of the iCafé. At block 530, the routine stores the pre-fetched (and potentially encrypted) content. The routine may store the content in shared and/or removable media. When stored in shared media, the content may be available from any computer at the iCafé. When stored in removable media, the removable media may be provided to the user so that the user does not have to view the content at the iCafé. When the user is provided content on removable media, the iCafé may charge the user based on the bandwidth used to download the content rather than hourly use of a computer. At block 532, the routine returns.

Figures 6A, 6B, 6C:
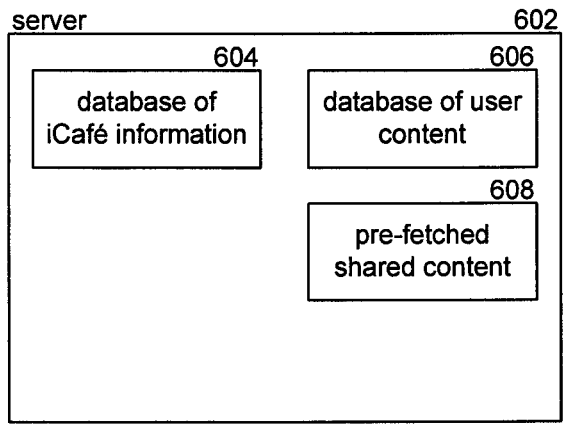
FIG. 6A is a block diagram illustrating databases employed by the technology in various embodiments.
FIGS. 6B-6C are table diagrams illustrating tables employed by the technology in various embodiments to store information.

FIG. 6A is a block diagram illustrating databases employed by the technology in various embodiments to store information. A server 602 may store or have access to a database of iCafé-related information 604, a database of user (or private) content 606, and a database of pre-fetched shared content 608. The server 602 may be associated with an iCafé and may be located at the premises of the iCafé or elsewhere. Alternatively, the server may be associated with a shared server that facilitates identification of iCafés. The database of iCafé information 604 may store information pertaining to the iCafé or other iCafés, such as their location, present wait time, whether seats are available, number of computers, processors, operating systems, affiliation with groups of iCafés, whether the premises are is heated and/or air conditioned, and so forth. The database of user content 606 may store information pertaining to users, private information, or information the user has requested. The information pertaining to users may include browser history, favorites, account credentials, preferences, search history, and so forth. The database 606 may store indications of pre-fetched information (e.g., URLs) instead of (or in addition to) the information itself. The pre-fetched shared content database 608 can store indications of pre-fetched content that are stored at iCafés.

FIG. 6B is a table diagram illustrating a table employed by the technology in some embodiments. The table 620 includes an iCafé ID column 622, location column 624, and column 626 that stores minimum waiting times and/or queue information relating to seats/number of computers (e.g., how many seats are available). The location column 624 may store addresses, GPS information, and so forth. The table 620 may be used to determine which iCafés near a user have the least waiting times.

While FIG. 6B and each of the table diagrams discussed below show a table whose contents and organization are designed to make them more comprehensible by a human reader, those skilled in the art will appreciate that actual data structures used by the technology to store this information may differ from the table shown, in that they, for example, may be organized in a different manner; may contain more or less information than shown; may be compressed and/or encrypted; etc. Additional databases may also be used. For example, a database with iCafé information may provide an address or GPS coordinates for each iCafé ID, facilities available at the iCafé, and so forth.

FIG. 6C is a table diagram illustrating a table employed by the technology in some embodiments. The table 630 includes an iCafé ID column 632 and a pre-fetched content column 634. The table 630 may be used to determine which iCafés near a user have stored pre-fetched content that the user may be interested in.

Figure 7:
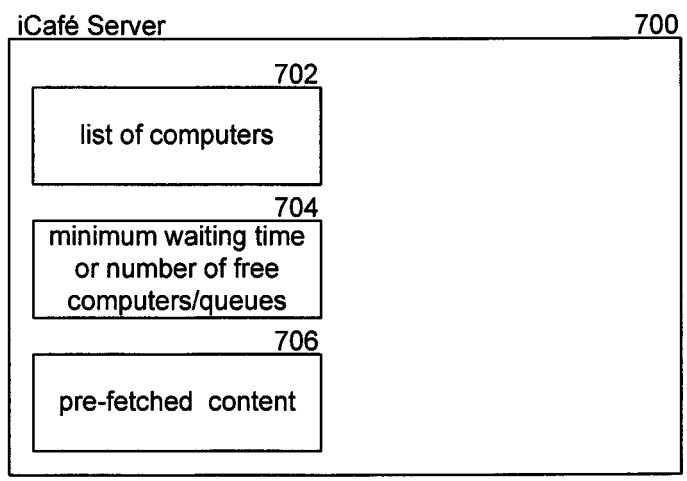
FIG. 7 is a block diagram illustrating components of the technology in various embodiments.

FIG. 7 is a block diagram illustrating components of the technology in various embodiments. An iCafé server 700 may store or have access to a list of computers 702, a database 704 that stores minimum waiting times and/or queue information relating to seats/number of computers (e.g., how many seats are available), and a database 706 of pre-fetched content. Some or all of the pre-fetched content may be encrypted. For example, private content particular to a user may be encrypted and shared content common to all users may not be encrypted.

Figure 8:
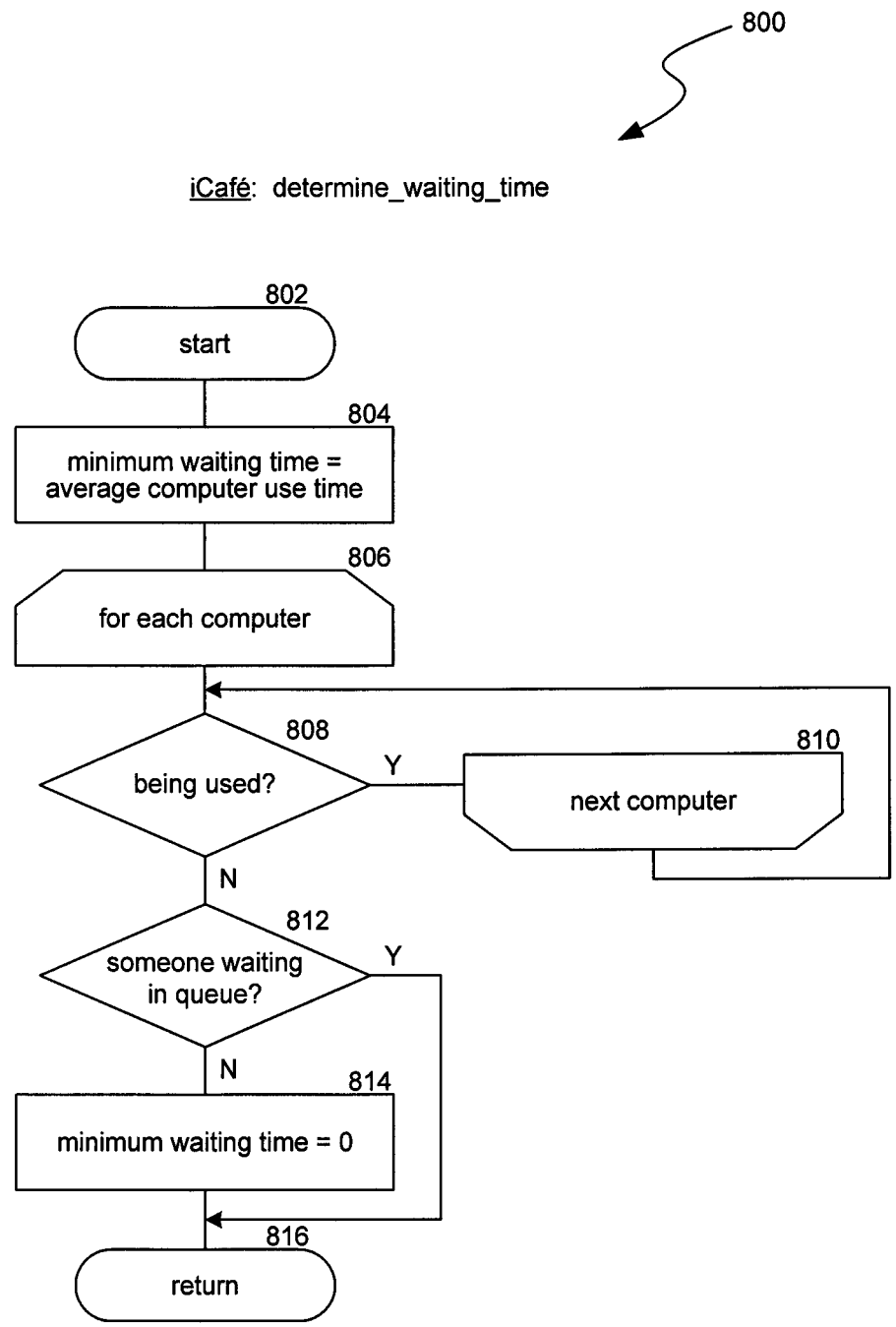
FIG. 8 is a flow diagram illustrating a routine invoked by the technology in some embodiments to determine waiting time at an iCafé.

FIG. 8 is a flow diagram illustrating a routine invoked by the technology in some embodiments to determine waiting time at an iCafé. The routine 800 may be invoked by an iCafé server to determine a waiting time. The routine 800 begins at block 802. At block 804, the routine sets a minimum waiting time variable to an average computer (or seat) use time. The average computer use time may have been previously computed based on actual observation of use of computers or seats. In the loop of blocks 806 through 810, the routine determines whether each computer is being used. At block 806, the routine selects a computer or seat. At decision block 808, the routine determines whether the selected computer is being used. The routine may make this determination based on whether a user is logged in, keyboard activity, observation via a camera, manual record-keeping by an operator, indication by a user, an application running at the computer, and so forth. If the selected computer is being used, the routine continues at block 810. Otherwise, the routine continues at decision block 812. At block 810, the routine selects another computer. At decision block 812, the routine determines whether there is another person waiting in the queue. The routine may make this determination based on observation or manual entry. If someone else is waiting in the queue, the routine continues at block 816. Otherwise, the routine sets the minimum waiting time to zero because there is a free seat. The routine then continues at block 816, where it returns.

Figure 9:
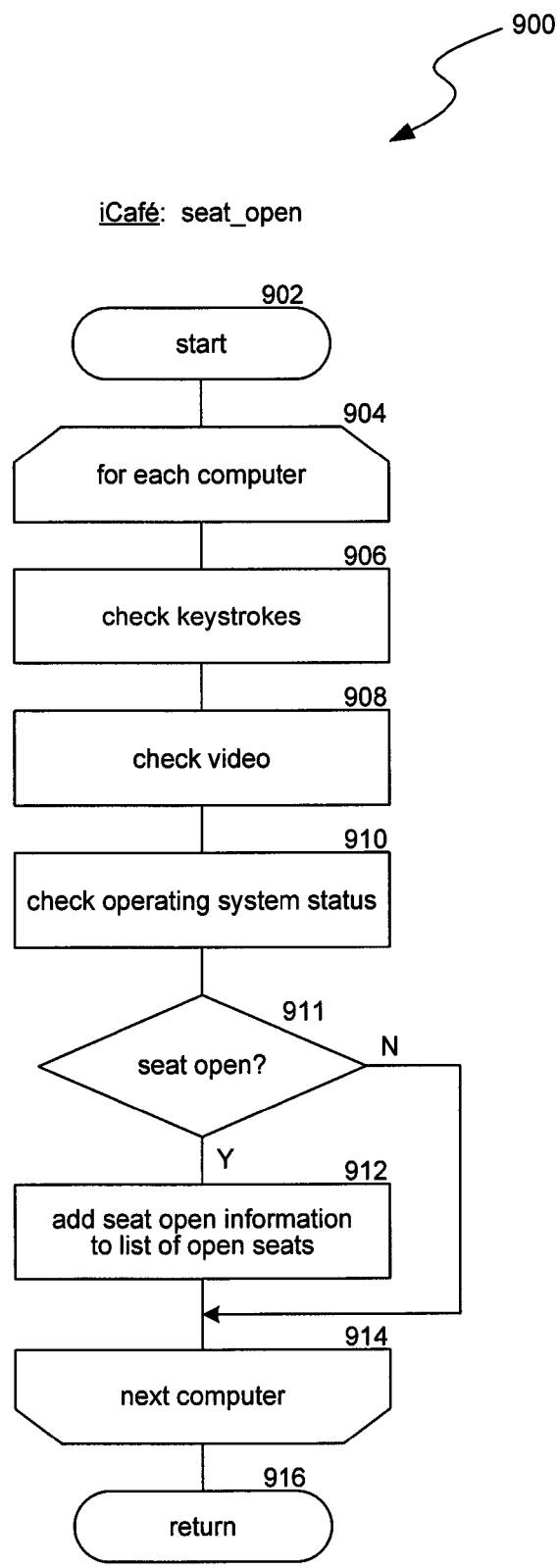
FIG. 9 is a flow diagram illustrating a routine invoked by the technology in some embodiments to determine whether a seat is open.

FIG. 9 is a flow diagram illustrating a routine invoked by the technology in some embodiments to determine whether a seat is open. The routine 900 may be invoked by an iCafé server to determine whether there are any seats open. The routine 900 begins at block 902. Within the loop of blocks 904 through 914, the routine determines whether any seats are open. At block 904, the routine selects a computer or seat. At block 906, the routine determines whether the selected computer has received any keystrokes. If a seat has been selected that does not have a computer, the routine may determine whether the seat is in use based on whether a network interface card is connected or in use (e.g., based on network traffic). At block 908, the routine determines whether a user is at the seat based on a video signal (e.g., from a camera connected to the computer are present at the iCafé). At block 910, the routine checks operating system status (e.g., whether a user is logged in, the processor is being used, and so forth). At decision block 9/11, the routine determines whether the seat is open based on the previous determinations made in blocks 906 through 910. If the seat is open, the routine continues at block 912. Otherwise, the routine continues at block 914. At block 912, the routine adds information that the seat is open to a list of open seats. At block 914, the routine selects another computer or seat. The routine returns at block 916.

Figure 10:
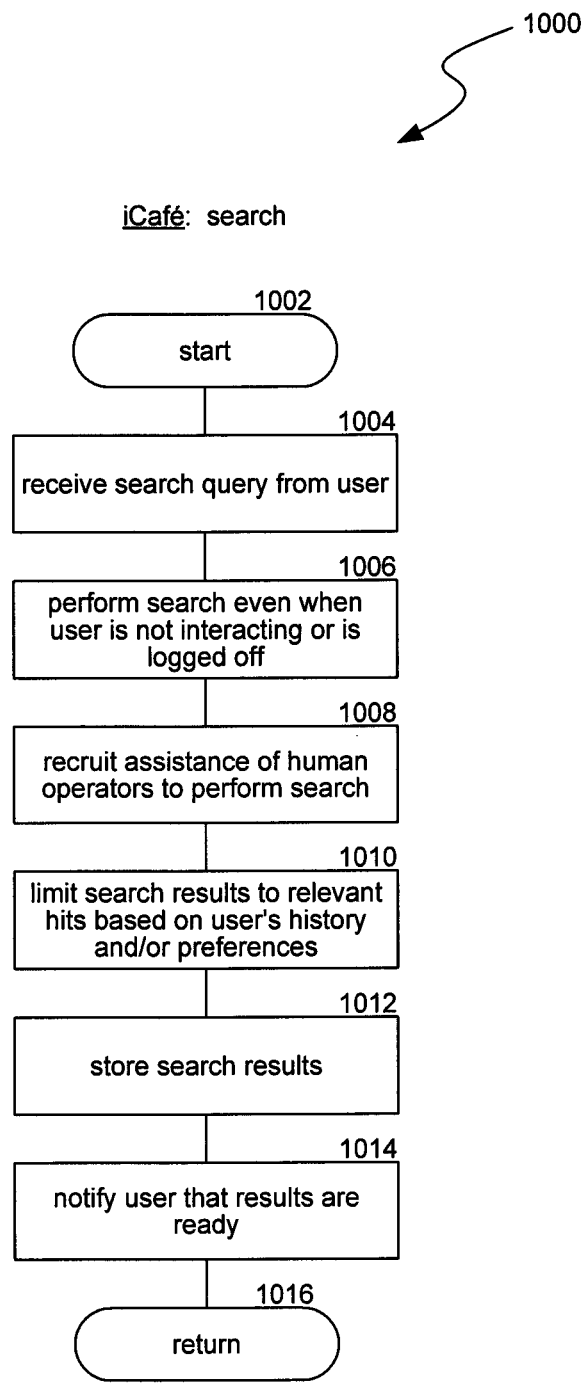
FIG. 10 is a flow diagram illustrating a routine invoked by the technology in some embodiments to search for information.

FIG. 10 is a flow diagram illustrating a routine invoked by the technology in some embodiments to search for information. An iCafé server may invoke the routine 1000 to perform searches for users. The routine 1000 begins at block 1002. At block 1004, the routine receives a search query from a user. The routine may store the received search queries, such as in a database. At block 1006, the routine performs a search even when the user is not interacting or is logged off. At block 1008, the routine may request the assistance of human operators to help perform the search. At block 1010, the routine may cull or limit the search results to relevant hits based on the user's history and/or preferences. For example, when the user searches for "jaguar," the routine may limit search results to animals rather than cars or other objects based on the user's other searches, browser history, favorites, etc. At block 1012, the routine stores the search results. At block 1014, the routine notifies the user that the search results are ready. As an example, the routine may send an SMS message to the user.

Figure 11:
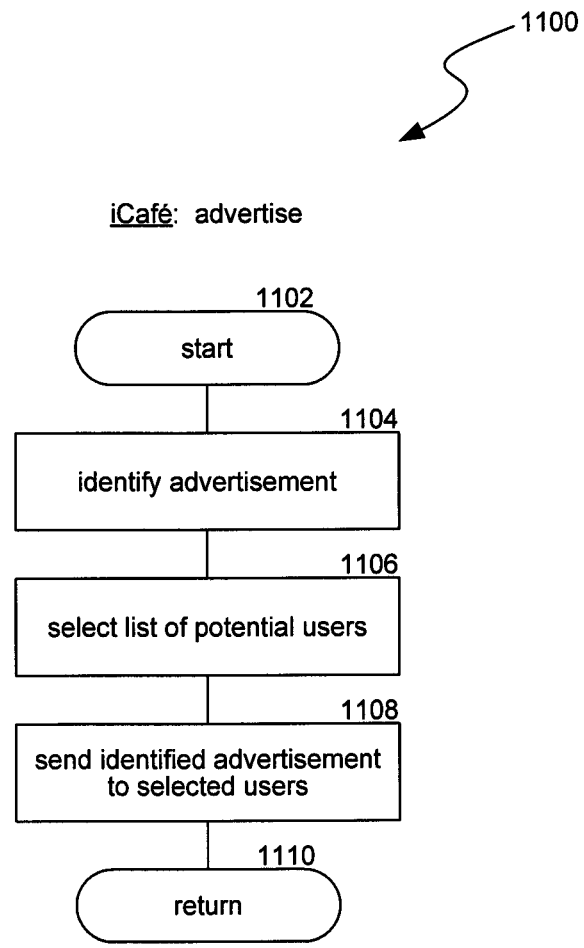
FIG. 11 is a flow diagram illustrating a routine invoked by the technology in some embodiments to advertise.

FIG. 11 is a flow diagram illustrating a routine invoked by the technology in some embodiments to advertise. An iCafé server may invoke the routine 1100 to send advertisements to users. The routine 1100 begins at block 1102. At block 1104, the routine identifies an advertisement. As an example, the routine may identify an advertisement based on users' previously indicated preferences or history. At block 1106, the routine selects a list of potential users. As an example, the routine selects a list of users who may be interested in receiving the identified advertisement. At block 1108, the routine sends the identified advertisement to the selected users. The routine returns at block 1110.

Figure 12:
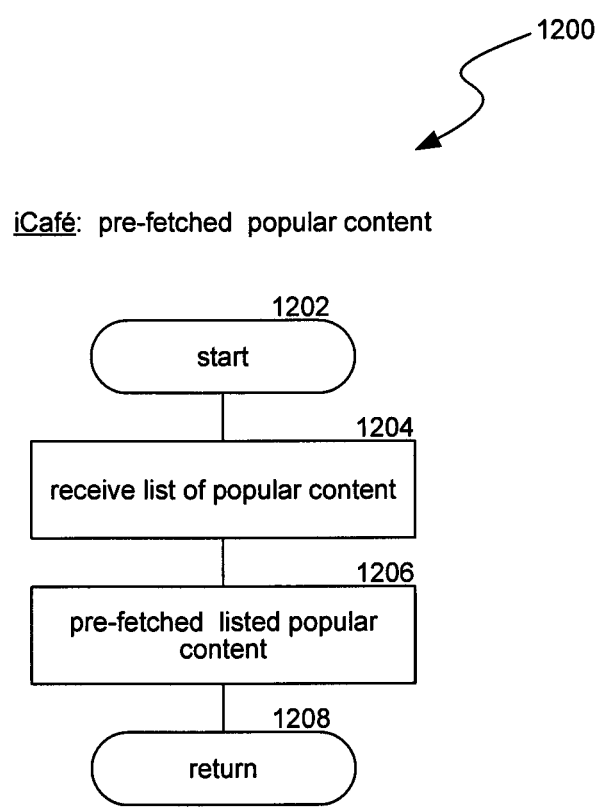
FIG. 12 is a flow diagram illustrating a routine invoked by the technology in some embodiments to pre-fetch popular content.

FIG. 12 is a flow diagram illustrating a routine invoked by the technology in some embodiments to pre-fetch popular content. An iCafé server may invoke the routine to pre-fetch popular content. Popular content can be content that may interest several users. Examples include music, movies, documents, web sites, blogs, and so forth. The routine 1200 begins at block 1202. At block 1204, the routine receives a list of popular content. The list can be provided manually (e.g., user input) or automatically (e.g., from a document). At block 1206, the routine pre-fetches the listed popular content and stores it. The routine may also update various databases indicating the availability of the pre-fetched content. At block 1208, the routine returns.

Figure 13:
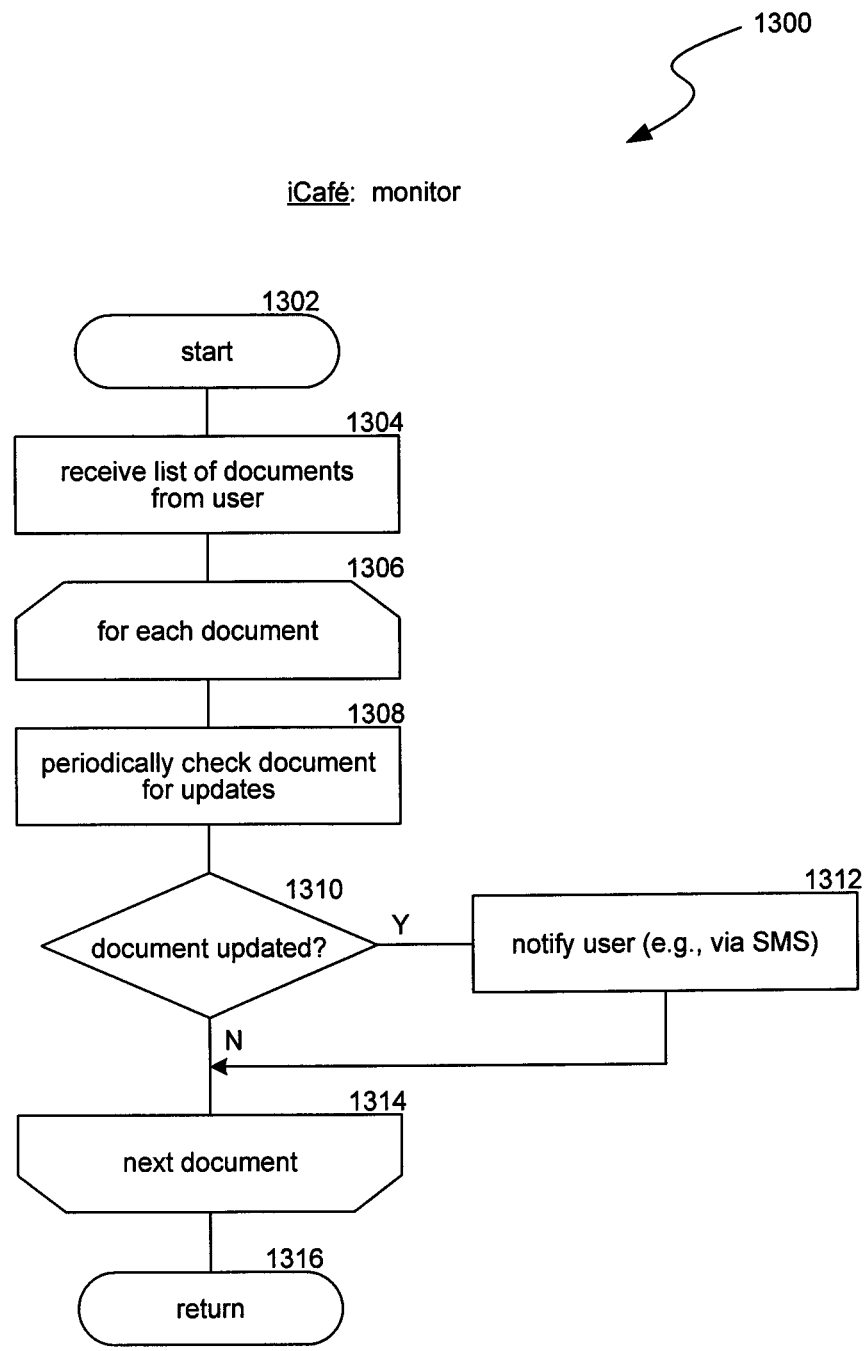
FIG. 13 is a flow diagram illustrating a routine invoked by the technology in some embodiments to monitor for updates to documents.

FIG. 13 is a flow diagram illustrating a routine invoked by the technology in some embodiments to monitor for updates to documents. The routine 1300 may be invoked by an iCafé server to monitor for changes to documents indicated by users. The routine 1300 begins at block 1302. At block 1304, the routine receives a list of documents from a user. The routine may store the documents. The loop between blocks 1306 through 1314 may be performed periodically to check for updates to documents. At block 1306, the routine selects a document. At block 1308, the routine periodically checks the selected document for updates. As an example, the routine may check documents stored at websites for changes. At decision block 1310, the routine determines whether the document has been updated. As examples, the routine may determine whether the contents of the document have changed, the document indicates a new date or time, etc. If the document has been updated, the routine continues at block 1312. Otherwise, the routine continues at block 1314. At block 1312, the routine notifies the user, such as by sending an e-mail message, SMS message, or other communication. The routine then continues at block 1314, work selects another document from the list of documents received from the user. At block 1316, the routine returns.

Various alternate embodiments will now be described. The embodiments may operate independently or jointly.

The technology may include functions for receiving a first information from a first shared computing premise indicative of availability of a first seat at the first shared computing premise; receiving a second information from a second shared computing premise indicative of availability of a second seat at the second shared computing premise; receiving a request from a user to identify a shared computing premise; computing a first rank for the first seat based on the received first information; computing a second rank for the second seat based on the received second information; creating a list including the first and the second seats; sorting the list based on at least the first and second rank; and transmitting the sorted list to the user. The technology may also include functions for receiving the request from the user via a mobile device communications protocol, such as SMS. The first and the second ranks may be computed based on a distance between a present geographic location of the user and a geographic location of each of the first and the second shared computing premises, respectively. The first and the second ranks may be computed based on a waiting time for the first and the second seats, respectively. The first and the second ranks may be computed based on availability of previously fetched content at the first and the second shared computing premises, respectively. The first and the second ranks may be computed based on a measure of quality of the first and the second seats, respectively. The measure of quality may be based on one or more of a cost, a processor speed, a download speed, an operating system, and a subjective preference. The technology may include functions for receiving a first bid from the first shared computing premise and a second bid from the second shared computing premise, wherein the computed ranks are based at least partially on the received first and second bids. The technology may include functions for receiving a request from the user to reserve the first seat and transmitting the reservation request to the first shared computing premise. The technology may include functions for providing an estimated time of arrival to the first shared computing premise. The functions may include functions for causing the first shared computing device to pre-fetch content. The reservation request may be received from the user via a mobile device communication protocol and transmitted to the first shared computing premise via a different data communications protocol.

The technology may include one or more computer-readable media collectively storing computer-executable instructions that, when executed by a processor, perform a method for pre-ordering at a shared computing premise. The method may include functions for collecting information indicative of seat availability; periodically uploading the collected information to a shared server; receiving a request to reserve a seat for a user; pre-fetching content; and storing the pre-fetched content. The functions for collecting may include functions for observing whether a user has logged into a computer or used an input device within a specified period of time. The collecting may include determining based on input from a digital camera whether the seat is occupied. The technology may also include functions for storing the pre-fetched content in removable media. The technology may also include functions for encrypting the pre-fetched content.

The technology may include a system for pre-ordering, comprising: a component that is configured to store user-specified criteria; a component that is configured to retrieve a document matching the user-specified criteria even when a user that has specified the criteria is not logged on; and a component that is configured to notify the user when the document matching the criteria has been pre-fetched and stored via a mobile device communications protocol. The system may include a component that is configured to pre-fetch and store popular content for use at a shared computing premise.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system having a processor and memory for improving the availability and usefulness of computing resources by identifying a computing device at a shared computing premise and modifying the identified computing device with personalized content, the method comprising:

receiving a first information from a first computing device of a plurality of computing devices at a first shared computing premise, wherein the first information received from the first computing device is indicative of availability of the first computing device of the plurality of computing devices at the first shared computing premise, wherein the first computing device at the first shared computing premise is associated with a next computing device of the plurality of computing devices at the first shared premise, wherein the first information includes at least an indication of available network bandwidth of at least the first computing device at the first shared computing premise, and wherein the availability of the first computing device at the first computing device is determined based on a present operation of the first computing device at the first computing premise;

receiving a second information from a second shared computing premise indicative of availability of a second computing device at the second shared computing premise wherein each computing device at the second shared computing premise is associated with a computing device and the second information includes at least an indication of available network bandwidth at the second shared computing premise;

receiving a request from a user to identify a shared computing premise;

computing by the processor a list of computing devices including the first and the second computing device-based on the first information and the second information;

transmitting the list to the user;

receiving, over a computer network, a request to reserve the first computing device and transmitting the reservation request to the first shared computing premise;

causing, in response to the transmitted reservation request, the first shared computing device to pre-fetch the personalized content; and modifying the state of first computing device by applying the personalized content.

2. The method of claim 1 further comprising receiving the request from the user via a mobile device communications protocol.

3. The method of claim 1 further comprising receiving the request from the user via an SMS protocol and transmitting the list to the user via the SMS protocol.

4. The method of claim 1 wherein:

the list is created by computing a first rank for the first computing device based on the received first information;

computing by the processor a second rank for the second computing device based on the received second information;

sorting the list based on at least the first and second rank; and the first and the second ranks are computed based on a distance between a present geographic location of the user and a geographic location of each of the first and the second shared computing premises, respectively.

5. The method of claim 1 wherein:

the list is created by computing a first rank for the first computing device based on the received first information;

computing by the processor a second rank for the second computing device based on the received second information;

sorting the list based on at least the first and second rank; and the first and the second ranks are computed based on a waiting time for the first and the second computing device, respectively.

6. The method of claim 1 wherein:

the list is created by computing a first rank for the first computing device based on the received first information;

computing by the processor a second rank for the second computing device based on the received second information;

sorting the list based on at least the first and second rank; and the first and the second ranks are computed based on availability of previously fetched content at the first and the second shared computing premises, respectively.

7. The method of claim 1 wherein:

the list is created by computing a first rank for the first computing device based on the received first information;

computing by the processor a second rank for the second computing device based on the received second information;

sorting the list based on at least the first and second rank; and the first and the second ranks are computed based on a measure of quality of the first and the second computing device, respectively.

8. The method of claim 7 wherein the measure of quality is based on one or more of a cost, a processor speed, a download speed, an operating system, and a subjective preference.

9. The method of claim 1 further comprising receiving a first bid from the first shared computing premise and a second bid from the second shared computing premise, wherein:

the list is created by computing a first rank for the first computing device based on the received first information;

computing by the processor a second rank for the second computing device based on the received second information;

sorting the list based on at least the first and second rank; and the computed ranks are based at least partially on the received first and second bids.

10. The method of claim 1 further comprising providing an estimated time of arrival to the first shared computing premise.

11. The method of claim 1 wherein the reservation request is received from the user via a mobile device communication protocol and transmitted to the first shared computing premise via a different data communications protocol.

12. The method of claim 1, wherein the availability of the first computing device is determined automatically by the first shared computing premise.

13. The method of claim 1, wherein the present operation of the first computing device includes observing an operating system status of the first computing device.

14. The method of claim 1, wherein the present operation of the first computing device includes observing whether a user has logged into the first computing device or used an input device within a specified period of time.

15. The method of claim 1, wherein the present operation of the first computing device includes determining, based on input from a digital camera, whether the first computing device is occupied.

16. The method of claim 1, wherein the personalized content comprises one or more of:

email messages;
websites identified as favorites of the user;
music;
videos;
photos; or
blogs.

17. The method of claim 1, further comprising receiving an identification of search criteria or documents of interest for the user;

wherein the personalized content is pre-fetched based on a search using the search criteria or based on the documents of interest.

18. A computer-readable medium storing instructions that, when executed by a computing system, perform operations for improving the availability and usefulness of computing resources by identifying a computing device at a shared computing premise and modifying an operational state of the computing device, the operations comprising:

receiving a first information from a first computing device of a plurality of computing devices at a first shared computing premise, wherein the first information received from the first computing device is indicative of availability of the first computing device of the plurality of computing devices at the first shared computing premise, wherein the first computing device at the first shared computing premise is associated with a next computing device of the plurality of computing devices at the first shared premise, wherein the first information includes at least an indication of available network bandwidth of at least the first computing device at the first shared computing premise, and wherein the availability of the first computing device at the first computing device is determined based on a present operation of the first computing device at the first computing premise;

receiving a second information from a second shared computing premise indicative of availability of a second computing device at the second shared computing premise wherein each computing device at the second shared computing premise is associated with a computing device and the second information includes at least an indication of available network bandwidth at the second shared computing premise;

receiving a request from a user to identify a shared computing premise;

computing by the processor a list of computing devices based on the first information and the second information;

transmitting the list to the user;

receiving, over a computer network, a request to reserve the first computing device and transmitting the reservation request to the first shared computing premise;

causing, in response to the transmitted reservation request, a change in the operational state of the first computing device by altering operations available to users of the first computing device.

19. A system for improving the availability and usefulness of computing resources by identifying a computing device at a shared computing premise and modifying an operational state of the computing device, the system comprising:

a memory;

one or more processors;

an availability tracking module configured to:
receive a first information from a first computing device of a plurality of computing devices at a first shared computing premise, wherein the first information received from the first computing device is indicative of availability of the first computing device of the plurality of computing devices at the first shared computing premise, wherein the first computing device at the first shared computing premise is associated with a next computing device of the plurality of computing devices at the first shared premise, wherein the first information includes at least an indication of available network bandwidth of at least the first computing device at the first shared computing premise, and wherein the availability of the first computing device at the first computing device is determined based on a present operation of the first computing device at the first computing premise; and receive a second information from a second shared computing premise indicative of availability of a second computing device at the second shared computing premise wherein each computing device at the second shared computing premise is associated with a computing device and the second information includes at least an indication of available network bandwidth at the second shared computing premise;

an interface configured to receive a request from a user to identify a shared computing premise;

an availability module configured to create a list including the first and the second computing device based on the received first information and the received second information; and a reservation module configured to:
transmit the list to the user
receive a request to reserve the first computing device; and
transmit the reservation request to the first shared computing premise; and
cause a change in the operational state of the first computing device based on the reservation request.

* * * * *